United States Patent [19]
Muylaert

[11] Patent Number: 5,951,252
[45] Date of Patent: Sep. 14, 1999

[54] HELICOPTER FLAP LOCK ASSEMBLY

[75] Inventor: Neal W. Muylaert, Apache Junction, Ariz.

[73] Assignee: McDonnell Douglas Helicopter Company, Mesa, Ark.

[21] Appl. No.: 08/928,905

[22] Filed: Sep. 12, 1997

[51] Int. Cl.⁶ .................................................. B64C 27/38
[52] U.S. Cl. ........................ 416/140; 416/107; 416/143; 416/153
[58] Field of Search .................................. 416/140, 142, 416/143, 153, 160, 107, 141

[56] References Cited

U.S. PATENT DOCUMENTS

| | | | |
|---|---|---|---|
| 4,178,130 | 12/1979 | Ferris et al. ............................. | 416/107 |
| 4,284,387 | 8/1981 | Ferris ..................................... | 416/143 |
| 4,368,006 | 1/1983 | Ferris et al. ........................ | 416/140 A |
| 5,007,799 | 4/1991 | Mouille et al. ..................... | 416/140 A |

*Primary Examiner*—F. Daniel Lopez
*Assistant Examiner*—Richard Woo
*Attorney, Agent, or Firm*—Stout, Uxa, Buyan & Mullins, LLP

[57] ABSTRACT

A flap lock device for restraining the flapping movement of a main rotor blade assembly on a helicopter. The flap lock device includes an first elongate frame member which extends between a first end and a second end and second elongate frame member which also extends between a first end and a second end. A pivot connection pivotally connects the first end of the first frame member with the first end of the second frame member. An outwardly facing contact pad is coupled to each of the frame members and adapted for contact with various positions on the helicopter. An actuating device interconnects the first and second frame members and is used to forcibly move the contact pads outwardly and into contact with the helicopter. The flap lock device is installed between the main rotor blade assembly and the main rotor assembly to forcibly maintain the main rotor blade assembly against the droop stop mechanism.

20 Claims, 4 Drawing Sheets

HELICOPTER FLAP LOCK ASSEMBLY

FIELD OF THE INVENTION

This invention relates generally to main rotor blades on helicopters and more particularly, to a device and associated method for restraining the flapping movement of a main rotor blade.

BACKGROUND OF THE INVENTION

Modern helicopter configurations typically include a plurality of individual main rotor blade assemblies which are each coupled to a main rotor shaft assembly. An engine rotates the main rotor shaft which, in turn, rotates or spins the attached main rotor blade assemblies to provide lift and thus, flight for the helicopter. The pitch of each of the main rotor blade assemblies is adjustable to facilitate the forward movement and control of the helicopter.

The main rotor blade assemblies are each coupled to the main rotor shaft assembly in such a manner as to accommodate several degrees of freedom of motion. Previously, this coupling utilized a hinged connection. However, in modern helicopters, each of the main rotor blade assemblies is connected to the main rotor assembly through a flexible elastic joint type of connection.

These flexible joint connections between each of the main rotor blade assemblies and the main rotor assembly are required due to the wide variation and ever changing loads carried be the main rotor blade assemblies. More specifically, the main rotor blade assemblies must adjust from a no load condition (parked) to a fully loaded flight condition. During flight, the main rotor blade assemblies must react both the centrifugal force as well as the load from the helicopter. Various in flight loads must also be reacted.

To accommodate these loads, each of the main rotor blade assemblies is designed with a certain degree of relatively free movement or flexibility in a direction generally parallel to the main rotor shaft. This movement is often referred to as "flap" or main rotor blade flap. The flexible type joint connections are designed to accommodate this movement. However, over-flexing or flap movement beyond the flexible limit of the joint connection may cause serious damage to the joint connection as well as the main rotor assembly.

When the helicopter is in a parked condition, the main rotor assembly is static and each of the rotor blade assemblies is stationary and generally unloaded. In this condition, gravity pulls each of the main rotor blade assemblies down to their lowest possible position. This is typically called rotor blade droop. Generally, a droop stop mechanism or other mechanical stop is provided to prevent each of the main rotor blade assemblies from drooping so low as to overextend or otherwise overload each of the flexible joint type connections.

When the main rotor assembly is rotating, each of the main rotor blade assemblies is forced upwardly by the centrifugal force and other loads. This force pivots the main rotor blade assemblies at their respective flexible joint connections and lifts than off of the droop stop mechanism. The centrifugal force, which is typically large in comparison to the generally vertical flight loads, prevents the main rotor blade assemblies from moving upwardly beyond the flexible limit of the flexible joint type connections. However, when the helicopter is parked, their is no mechanism to prevent the main rotor blade assemblies from flapping or otherwise being moved upwardly and over extending the flexible joint type connections. This is a particular concern during windy conditions, when the weight of each rotor blade assembly is not enough to resist the wind generated lift forces.

Another problem with the free flapping of the main rotor blade assemblies occurs during storage or non flight transportation operations. During these operations, the main rotor blade assemblies are often bounced or otherwise moved off of their droop stop mechanisms. This bouncing can over extend the flexible joint type connection causing damage as previously described. In addition, these operations often require that each of the main rotor blades be folded aft or rearward to a secure storage position.

The ability to fold the main rotor blades is highly desirable and sometime a mandatory operational feature. However, many modern helicopters have no mechanism to restrain the main rotor blades from flapping up or down during the folding process. This problem is hazardous to both personnel and the aircraft hardware. The problem is magnified if the folding operation is performed in a windy environment.

SUMMARY

The present invention overcomes the aforementioned problems by providing a flap lock device which restrains the flapping movement of a main rotor blade assembly on a helicopter. By installing the flap lock device of the present invention between one of the main rotor blade assemblies and a main rotor assembly on the helicopter, the flapping movement of the main rotor blade is restrained. In particular, the flap lock device rigidly maintains the main rotor blade assembly fixed relative to the main rotor.

The present invention also satisfies the need for a device which can resist flapping movement of individual main rotor blade assemblies on a helicopter during storage and transportation operations. By providing a flap lock device which is insertable between the main upper hub assembly and the pitch case, flapping movement is prevented without hindering or otherwise obstructing the rotor blade fold or pivot location.

The present invention also satisfies the need for a device which can prevent flapping movement of individual main rotor blade assemblies on a helicopter and which are easy to install and remove, do not require any special tools and are inexpensive to manufacture.

The present invention is generally directed to a flap lock device for restraining the flapping movement of a main rotor blade assembly on a modern helicopter. As previously described, modern helicopters generally include a plurality of individual main rotor blade assemblies, including an individual main rotor blade. Each of the main rotor blade assemblies is attached to a main rotor assembly. The attachment of each main rotor blade assembly is adapted to allow for at least some flapping movement.

More specifically, each main rotor blade is coupled to a main upper hub assembly through a pitch case. The main rotor blade and the pitch case generally comprise the main rotor blade assembly. The main upper hub assembly is connected to the main rotor assembly, which in turn, is coupled to the main drive rotor. A flexible joint-type connection interconnects the main upper hub assembly and the pitch case and allows for multiple degrees of freedom of movement, including flapping movement.

The flap lock device includes a first elongate frame member which extends between a first end and a second end and a second elongate frame member which extends between a first end and a second end. A pivot connection connects the first frame member and the second frame member at each of their first ends. The pivot connection provides a pivot point and allows pivotal movement between the first and second frame members.

A first contact pad is attached to the first frame member and a second contact pad is attached to the second frame member. The first contact pad is adapted to be positioned against a portion of main rotor blade and the second contact pad is adapted to be positioned against a portion of the main rotor assembly of the helicopter.

An actuator is coupled to each of the first frame member and the second frame member. The actuator is adapted for moving the second end of the first frame member relative to the second end of the second frame member about the pivot connection. This movement forces the first and second frame members between a retracted position and an extended position. In the retracted position, the flap lock device is insertable between the main rotor assembly and one of the plurality of main rotor blade assemblies. The actuator is actuable to move the first frame member and thus, the first contact pad relative to the second contact pad until the main rotor assembly is fixed relative to the contacted main rotor blade assembly.

In another aspect of the present invention, the flap lock device comprises an actuator which includes an actuating member coupled to a threaded actuating shaft. The actuating member is used to rotate the actuating shaft which extends between the first frame member and the actuating member. A first bushing is coupled to the first frame member and rotatably coupled with a first end of the actuating shaft. An internally threaded bushing coupled to the second frame member is threadably coupled along the actuating shaft. Rotation of the actuating shaft forces the first frame member to pivot about the pivot connection and move relative to the second frame member.

In yet another aspect of the present invention, the flap lock device is configured for clamping one of the main rotor blade assemblies against a droop stop mechanism on the helicopter. In this aspect, the flap lock device is configured for use on a helicopter having a droop stop mechanism or other mechanical stop as previously described. In particular, the flap lock device maintains the main rotor blade assembly against the droop stop mechanism so that any flapping movement at the root end of the rotor blade assembly is prevented.

In this aspect of the present invention, the first contact pad is configured to be positioned against a portion of the main upper hub assembly and the second contact pad is configured for positioning against a portion of the pitch case. Each of the contact pads includes a hard plastic material for actual contact with the helicopter. When the first and second frame members are moved outwardly towards the expanded position, the pitch case is forced outwardly relative to the main upper hub assembly until the main rotor blade assembly is forced against the drop stop mechanism.

A preferred method for restraining the flapping movement of a main rotor blade assembly on a helicopter according to the principles of the present invention, comprises the steps of providing a flap lock device, such as the flap lock device of the present invention. In particular, the provided flap lock device may include a first contact pad for contacting against a first portion of the helicopter and a second contact pad for contacting against a second portion of the helicopter. The first contact pad is attached to a first frame member and the second contact pad is attached to a second frame member.

An actuating device is movably coupled to the first frame member through a first bushing and also movably coupled to the second frame member through an internally threaded second bushing. The first and second contact pads are movable between a retracted position and an expanded position through actuation of the actuating device which forces the second frame member to move along the threaded actuating shaft and thus, move relative to the first frame member.

The method also includes the steps of inserting the flap lock device between the main rotor blade assembly and the main upper hub assembly such that the first contact pad is aligned with a portion of the main upper hub assembly and the second contact pad is aligned with a portion of the associated pitch case. The actuating device is actuated to move the first contact pad and the second contact pad outwardly and towards the expanded position. The contact pads are moved outwardly until the first contact pad contacts the main upper hub assembly and the second contact pad contacts the associated pitch case. The actuating device is then tightened to rigidly fix the main upper hub assembly relative to the associated pitch case.

This invention, together with the additional features and advantages thereof, which is only summarized in the foregoing passages, will become more apparent to those of skill in the art upon reading the description of the preferred embodiments, which follows in the specification, taken together with the following drawings.

DESCRIPTION OF THE PREFERRED EMBODIMENTS

Figure 1:
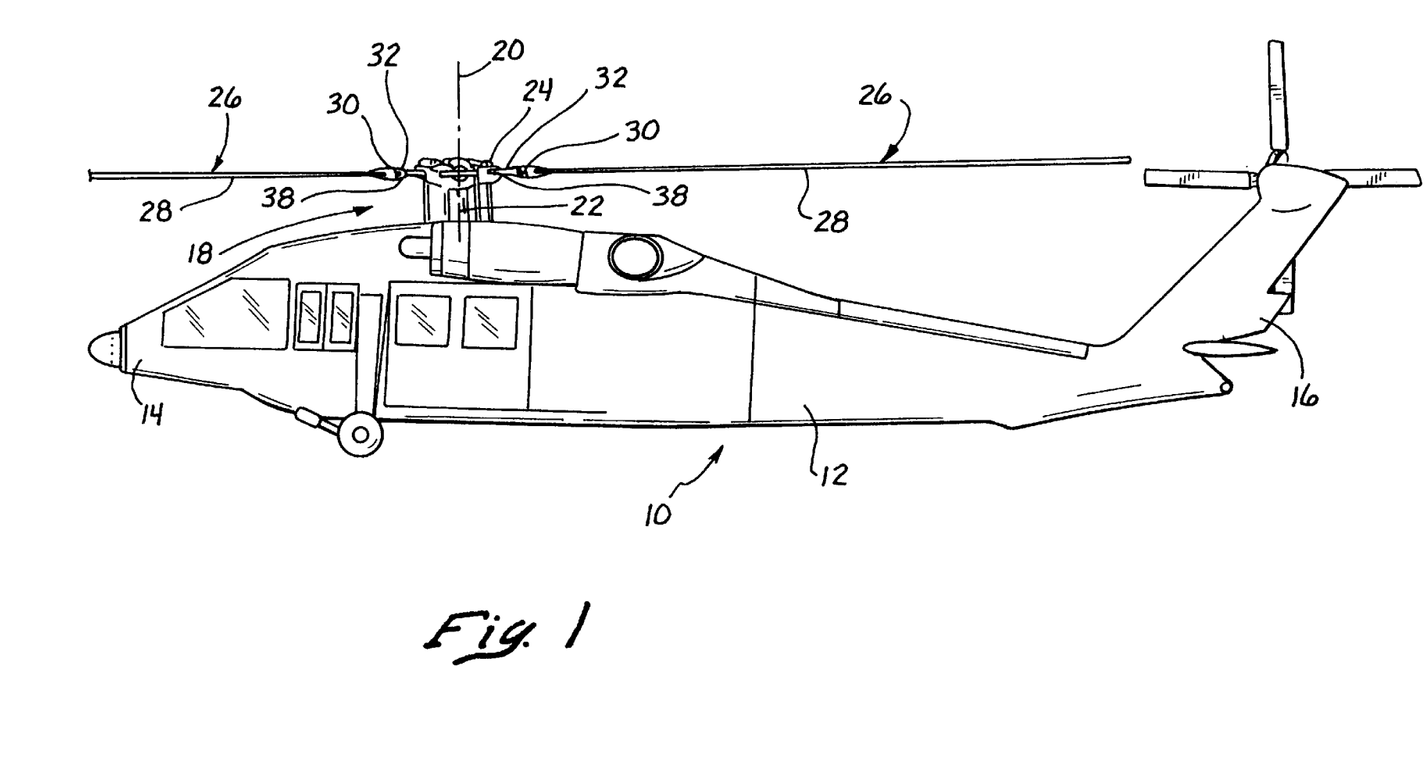
FIG. 1 is a side view of a modern helicopter.
Figure 2:
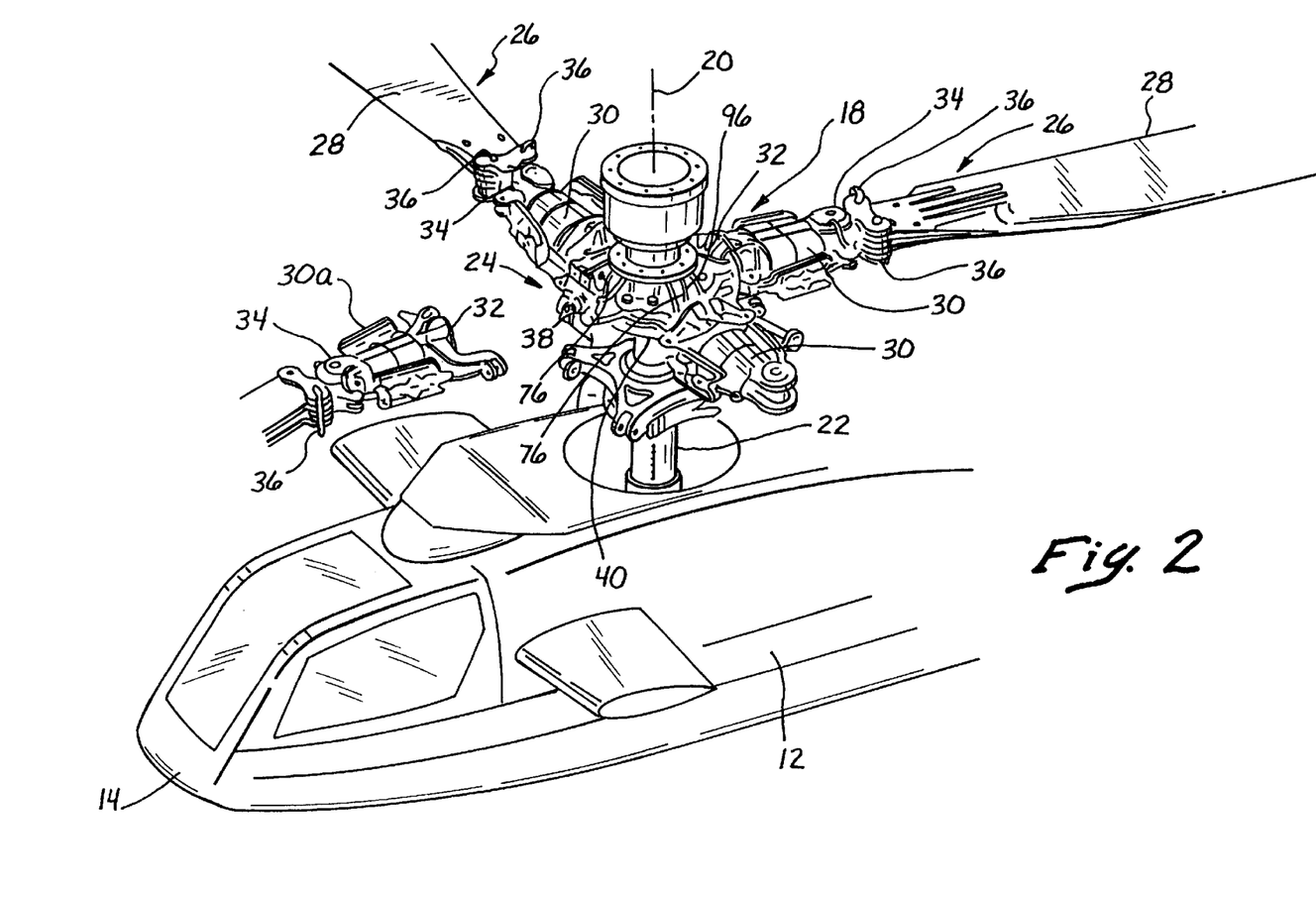
FIG. 2 is an enlarged partial view of the helicopter depicted in FIG. 1.

Referring now to the drawings, wherein like reference characters designate identical or corresponding parts throughout the several views and embodiments, a modern helicopter 10 is illustrated in FIGS. 1 and 2. As shown, the helicopter 10 includes a fuselage 12 which extends from a front end 14 to a tail section 16. A main rotor assembly 18 extends out of the fuselage 12 and defines an axis of rotation 20. The main rotor assembly 18 includes a main rotor shaft 22 and a main upper hub assembly 24. A plurality of main rotor blade assemblies 26 are coupled to the main rotor assembly 18 and particularly the main upper hub assembly 24.

Referring now, in particular, to FIG. 2, a more specific configuration of the modern helicopter 10 will be described. The illustrated helicopter 10 includes four main rotor blade assemblies 26 of which two are removed for detail. Each of the main rotor blade assemblies 26 comprises a main rotor blade or rotor blade 28 for purposes of this invention, and a pitch case 30. The pitch case 30 is coupled to the main upper hub assembly 24 at its root end 32.

More specifically, each rotor blade 28 is pinned or otherwise coupled to an outboard end 34 of the pitch case 30 through a plurality of fasteners 36, such as quick release pins. At least one of these quick release pins 36 may be removed to pivot or otherwise rotate the rotor blade 28 relative to the associated pitch case 30.

A flexible joint type connection 38 is used to connect each of the pitch cases 30 to the main upper hub assembly 24. As illustrated in FIG. 2, the pitch case identified by reference numeral 30a is shown separated at its root end 32 to expose the flexible joint type connection 38. The flexible joint 38, which may be an elastomeric bushing, is connected at one end to the main upper hub assembly 24 and at the other end to the root end 32 of the pitch case 30 or 30a. Each of these flexible joints 38 acts as a pivot and allows each main rotor blade assemblies 26 to flex and move relative to the main upper hub assembly 24 as previously described in the background section of this specification.

A droop stop mechanism 40 may provided between the main upper hub assembly 24 and each of the pitch cases 30. This droop stop mechanism 40, which may be a simple mechanical stop, prevents each of the main rotor blade assemblies 26 from drooping too low and over-extending or otherwise damaging the flexible joint 38.

Figure 3:
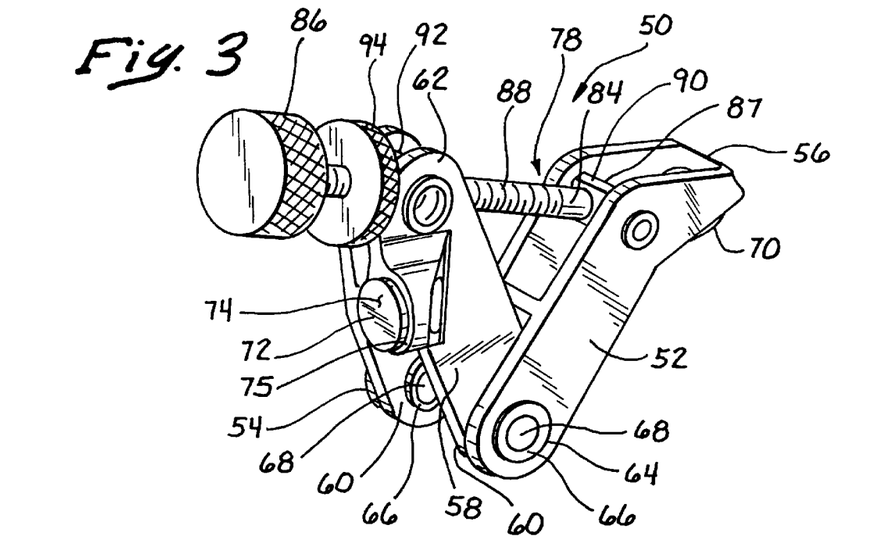
FIG. 3 is a perspective view of an embodiment of a flap lock device constructed in accordance with the principles of the present invention.

Referring now to FIG. 3, a flap lock device according to the principles of the present invention is illustrated and designated by the reference numeral 50. As shown, the flap lock device 50 includes an elongate first frame member 52 which extends between a first end 54 and a second end 56 and an elongate second frame member 58 which extends between a first end 60 and a second end 62. The frame members 52 and 58 may comprise a metal such as aluminum or steel, however, other high strength structural materials may also be used.

The first frame member 52 may be movably coupled to the second frame member 58. Preferably, this connection comprises a pivot connection 64 which couples the first end 54 of the first frame member 52 to the first end 60 of the second frame member 58. The pivot connection 64 may include a bushing 66, such as a pivot bushing, having a central bore 68.

A first contact pad 70 may be attached to the first frame member 52. The first contact pad 70 may be adapted for contacting a portion of the main upper hub assembly 24. However, the first contact pad 70 may be adapted for contacting most any surface on the main rotor assembly 18, depending on the configuration of the particular helicopter 10.

A second contact pad 72 may be attached to the second frame member 58. The second contact pad 72 may be adapted for contacting a portion of the pitch case 30. Preferably, the second contact pad 72 is adapted for contacting the root end 32 of the pitch case 30. However, the second contact pad 72 may also be adapted for contacting most any surface on the main rotor blade assembly 26, depending on the configuration of the particular helicopter 10.

Figure 4:
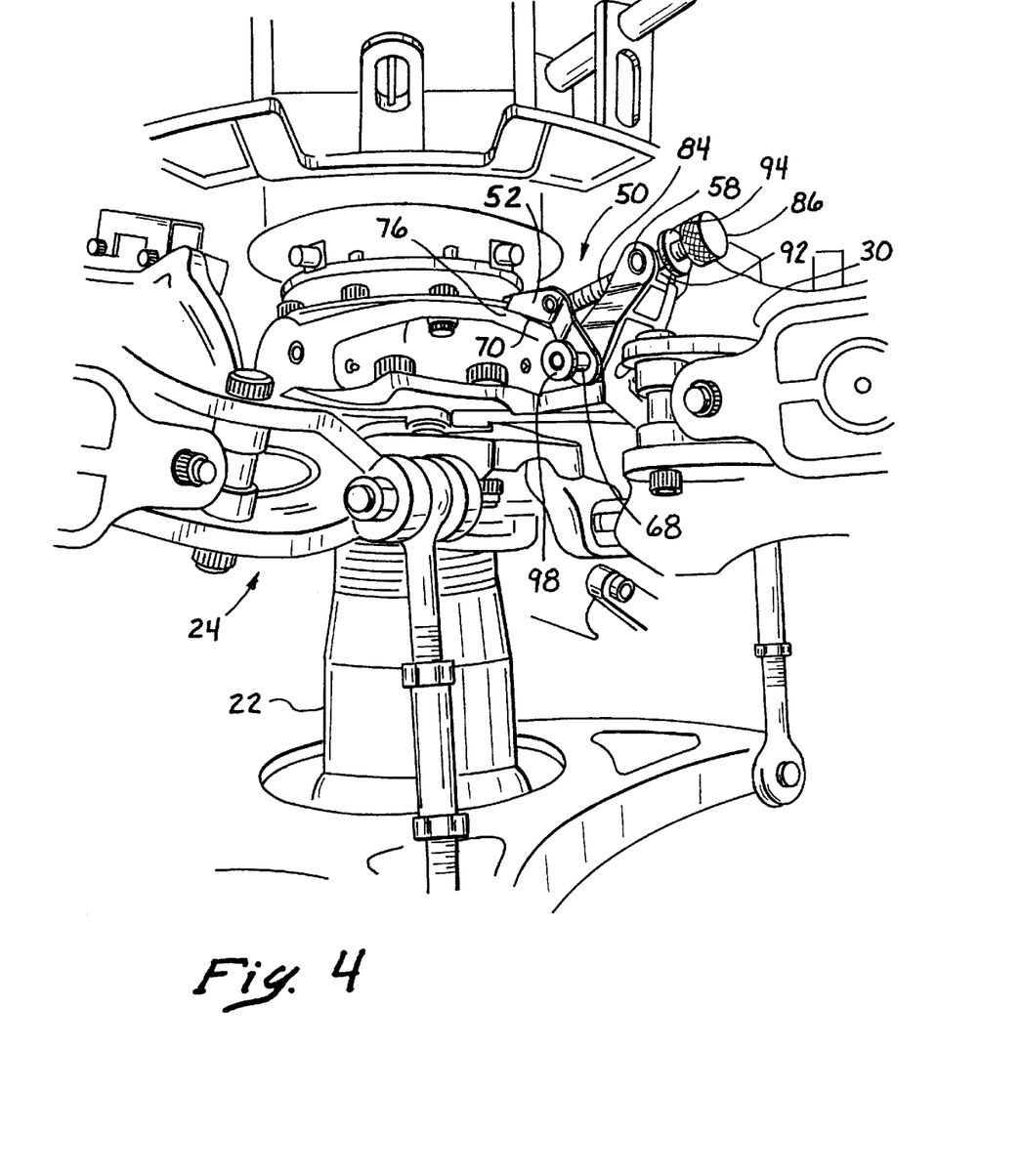
FIG. 4 is a perspective view of the flap lock device depicted in FIG. 3 shown mounted on a helicopter.

In the illustrated embodiment, the first contact pad 70 is directly attached to the first frame member 52 between the first end 54 and the second end 56. The first contact pad 72 is configured for directly contacting a reinforcement rib 76 on the main upper hub assembly 24, as best illustrated in FIGS. 2 and 4. However, the first contact pad 70 may also be located elsewhere along the first frame member 52 and oriented differently depending upon the expected contact position and the configuration of the helicopter 10.

The second contact pad 72 is directly attached to the second frame member 58 between the first end 60 and the second end 62. Similar to the first contact pad 70, the second contact pad 72 may also be located elsewhere along the second frame member 58 and oriented differently depending upon the expected contact position and the configuration of the helicopter 10.

Each of the first and second contact pads 70 and 72 may comprise an outwardly facing elastic member. Preferably, each of these elastic members comprises a hard plastic outer portion such as a nylon pad. Other materials may include rubber, plastic and the like. Alternatively, the contact pads 70 and 72 may be configured for placement against a specific surface of the helicopter 10 without causing damage. Preferably, each of the contact pads 70 and 72 has a sufficient contact surface area 74 to provide a strong bearing surface without concern for denting, puncturing or otherwise damaging the helicopter 10.

As illustrated, the first and second contact pads 70 and 72 are integral with each of the frame members 52 and 58. In particular, each contact pad 70 and 72 is coupled to a contact base 75. The first and second contact pads 70 and 72 may also be removably coupled to each of the frame members 52 and 58. This removable connection may include removably adhering the actual contact pads 70 and 72 to the support base 75 or alternatively, providing a support base which is removably attached to the frame members 52 and 58. By being removably connected, each contact pad 70 and 72 may be replaced, such as when worn or damaged. Also, specifically configured contact pads may be used for specific applications on individual helicopters.

Figure 5:
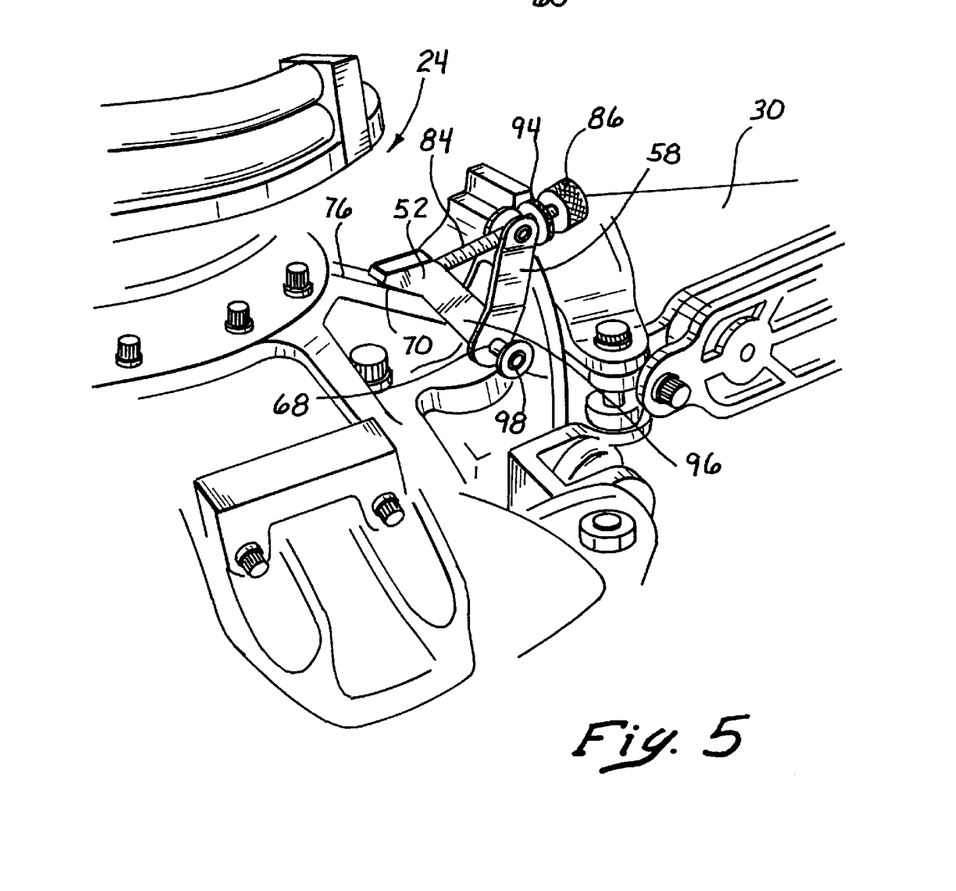
FIG. 5 is an alternative perspective view of the flap lock device as depicted in FIG. 4.

An actuator 78 may be coupled to each of the first frame member 52 and the second frame member 58 and configured for moving the first frame member 52 relative to the second frame member 58. The actuator 78 may move the frame members 52 and 58 between a retracted position, where the contact pads 70 and 72 are relatively close together (FIG. 3), and an extended position, where the contact pads 70 and 72 are moved farther apart (FIGS. 4 and 5). Preferably, the actuator 78 is manually operated, however, a powered system may also be used.

The actuator 78 may comprise an actuating shaft 84 which extends between an actuating member 86 and a first end 87. Preferably, the actuating shaft 84 includes a threaded portion 88 along its length. The threads 88 may be acme threads or similar. The actuating member 86 may be a manually operable handle, such as a knurled knob or the like. The actuating member 86 may also comprise a coupling or connection for powered rotation of the actuating shaft 84.

The actuator 78 may also comprise a first bushing 90 for rotatably supporting the actuating shaft 84. This first bushing 90 may be connected to the first frame member 52 and adapted for connection with the first end 87 of the actuating shaft. The first bushing 90 may also be coupled to the actuating shaft 84 between the first shaft end 87 and the actuating member 86.

Preferably, the first bushing 90 is maintained in a fixed position along the length of the actuating shaft 84 as well as on the first frame member 52. This configuration allows the actuating shaft 84 to freely rotate within the first bushing 90 but maintains the actuating shaft 84 from sliding or otherwise axially moving relative to the first bushing 90 and the first frame member 52. Alternatively, the first bushing 90 may comprise an internally threaded bushing having threads compatible with and mating to the threaded portion 88 of the actuating shaft 84. In this configuration, the first bushing 90 and thus, the first frame member 52 will move along the length of the actuating shaft 84 as it is rotated.

The actuator 78 may also comprise a second bushing 92 for rotatably supporting the actuating shaft 84. This second bushing 92 may be connected to the second frame member 58 and adapted for movable connection along the length of the actuating shaft 84. Preferably, the second bushing 92 is an internally threaded bushing with threads compatible with and mating to the threaded portion 88 of the actuating shaft 84. The second bushing 92 may be coupled to the second frame member 58 adjacent the second end 62.

In the preferred configuration, as illustrated and described, the threaded actuating shaft 84 is coupled to the first bushing 90 at its first shaft end 87 and extends through the second bushing 92 to the actuating member 86. Rotation of the actuating member 86 causes the second bushing 92 and thus, the second frame member 58 to move along the threaded portion 88 of the actuating shaft 84. This movement forces the first frame member 52 to pivot about the pivot connection 64 and move relative to the second frame member 58.

A locking device 94 may be provided for securing the first frame member 52 relative to the second frame member 58 and more particularly, for maintaining the position of the first contact pad 70 stationary and fixed relative to the second contact pad 72. Preferably, the locking device 94 may include a locking member which retrains the actuating shaft 84 from being rotated. This locking device 94 may include a lock nut having internal threads compatible with the threaded portion 88 of the actuating shaft 84. The locking nut 94 may be placed on the actuating shaft 84 between the second bushing 92 and the actuating member 86. Once the flap lock device 10 has been installed and expanded to its desired position, the lock nut 94 may be tightened against the second bushing 92 to prevent further rotation of the actuating shaft 84.

Referring now to FIGS. 1 through 5, a method of restraining the flapping movement of a main rotor blade assembly 26 on a helicopter 10 using the flap lock device 50 of the present invention will be described. The method particularly applies to modern helicopters, such as the helicopter 10 illustrated and described above. Although the method is generally directed to preventing the flapping movement of an individual main rotor blade assembly 26, it is to be understood that a separate flap lock device 50 may be applied to each of the main rotor blade assemblies 26 to resist their flapping.

The method includes the steps of providing a flap lock device, such as the flap lock device 50 of the present invention. The flap lock device 50 is inserted between one of the main rotor blade assemblies 26 and the main upper hub assembly 24. Particularly, the flap lock device 50 may be inserted such that the first contact pad 70 is aligned with a portion of the main upper hub assembly 26 and the second contact pad 72 is aligned with a portion of the pitch case 30. Preferably, the first contact pad 70 is aligned with a reinforcement rib 76 or other portion of the main upper hub assembly 24 which is located in directly line with the main rotor blade assembly 26. The second contact pad 72 is aligned with the root end 32 of the pitch case 30. To facilitate this insertion, the flap lock device 50 may be moved to its retracted position.

To secure the flap lock device 50 to the helicopter 10, a central pivot bore 68 may be provided as previously described. This central pivot bore 68 may be coaxially aligned with a second bore 96 on the main rotor assembly 18. Specifically, the helicopter 10 may be provided with a lifting eye or similar bore 96 adjacent to, or as part of, the main upper hub assembly 24. Once the central pivot bore 68 is aligned with this second bore 98, they may be secured together. Preferably, a locking pivot pin 98 may be inserted through the central pivot bore 68 and the lifting eye bore 96. The locking pivot pin 98 secures the flap lock device 50 to the main upper hub assembly 24 and allows the frame members 52 and 58 to pivot about both the pivot connection 64 and the locking pivot pin 98. Once engaged, the locking pivot pin 98 also advantageously prevents the dropping or falling of the flap lock device 50 during installation or removal.

After the flap lock device 50 is inserted and aligned between the pitch case 30 and the main upper hub assembly 24, the actuating device 78 may be actuated to move the first frame member 52 and thus, the attached first contact pad 70 outwardly relative to the second frame member 58 and thus, the attached second contact pad 72. This step of actuating the actuating device 78 moves the frame members 52 and 58 of the flap lock device 10 towards the extended position until the first contact pad 70 contacts the reinforcing rib 76 on the main upper hub assembly 24 and the second contact pad 72 contacts the root end 32 of the pitch case 30.

The actuating device 78 may then be tightened to further outwardly extend the contact pads 70 and 72 and to rigidly fix the main upper hub assembly 24 spaced apart from the pitch case 30. The step of tightening the actuating device 78 may act to move the first frame member 52 relative to the second frame member 58 until the main rotor blade assembly 26 is forced against the droop stop mechanism 40 on the helicopter 10. After the main rotor blade assembly 26 is forced down against the droop stop mechanism 40 or other stop, the actuating device 78 may be locked to maintain the main rotor blade assembly 26 fixed and spaced apart from the pitch case 30.

Actuating the actuating device 78, including tightening, may include rotating the threaded actuating shaft 84 which is connected to each of the frame members 52 and 58 through the first and second bushings 90 and 92. This forcibly pivots the frame members 52 and 58, and the attached contact pads 70 and 72, apart. An actuating member 86, such as a handle or other hand grip, may be provided to facilitate the hand or other manual operation of this step.

A locking device 94, such as an internally threaded lock nut or locking bushing, may be secured against the second bushing 92 or other portion of the actuating shaft 84 to prevent further rotation of the actuating shaft 84 and loosening of the flap lock device 50. Alternatively, a mechanical lock may be provided which prevents the first and second frame members 52 and 58 from moving from their installed positions. Additional flap lock devices 50 may be provided and installed on the remaining main rotor blade assemblies 26 in a similar fashion.

The installed flap lock device 50 acts as a fixed structural member to maintain the pitch case 30 in a relatively fixed and spaced apart position relative to the main upper hub assembly 24. This fixes the flexible joint connection 38 and thus, prevents the flapping movement of the main rotor blade 26. In a preferred embodiment, the flap lock device 50 acts to maintain the main rotor blade assembly 26 down against the droop stop mechanism 40. In this configuration, the flap lock device 50 acts as a structural lock, maintaining the pitch case 30 down against the droop stop mechanism 40.

Removal of the flap lock device 40 from the main rotor blade assembly 26, or from each of the main rotor blade assemblies 26, may be accomplished by reversing the installation steps. This includes loosening or otherwise removing the locking device 94 and actuating the actuator or actuating device 78 in reverse to retract the first and second contact pads 70 and 72. The locking pin 98 may also be removed from the lifting eye bore 96 for actual removal of the flap lock device 50.

It will be understood that various modifications can be made to the various embodiments of the present invention herein disclosed without departing from the spirit and scope thereof. For example, various types and combinations of contact pads, frame members and actuating devices for moving them, are contemplated, as well as various types of construction materials. Also, various modifications may be made in the size, thickness, shape and configuration of the parts and their interaction. Therefore, the above description should not be construed as limiting the invention, but merely as an exemplification of a preferred embodiment thereof. Those of skill in the art will envision other modifications within the scope and spirit of the present invention as defined by the claims appended hereto.

What is claimed is:

1. A flap lock device for restraining a main rotor blade assembly on a helicopter, said helicopter having a main upper hub assembly mounted to a main rotor shaft and said main rotor blade assembly being coupled to said main upper hub assembly through a pitch case, said flap lock device comprising:

a first frame member;

a second frame member movably coupled to said first frame member;

a first contact pad attached to said first frame member and being adapted for contacting a portion of said main upper hub assembly;

a second contact pad attached to said second frame member and being adapted for contacting a portion of said pitch case;

an actuator coupled to each of said first frame member and said second frame member and being adapted for moving said first frame member relative to said second frame member and between a retracted position and an extended position; and a locking device for maintaining said first frame member from moving relative to said second frame member;

wherein said flap lock device is insertable between said main upper hub assembly and said pitch case when in said retracted position.

2. The flap lock device as recited in claim 1 wherein at least one of said contact pads comprises a plastic.

3. The flap lock device as recited in claim 1, and further comprising an internally threaded bushing coupled to said first frame member and wherein said actuator comprises a threaded shaft adapted for threadable engagement with said threaded bushing to forcibly move said first frame member relative to said second frame member.

4. The flap lock device as recited in claim 3, and further comprising a second internally threaded bushing coupled to said second frame member and adapted for threadable engagement with said threaded shaft.

5. The flap lock device as recited in claim 1 wherein said first frame member and said second frame member are movably coupled through a pivot connection.

6. The flap lock device as recited in claim 5 wherein said pivot connection comprises a pivot bushing having a central bore.

7. A flap lock device for clamping a main rotor blade assembly down against a droop stop mechanism on a helicopter, said helicopter having a main upper hub assembly mounted to a main rotor shaft and said main rotor blade assembly being coupled to said main upper hub assembly through a pitch case, said flap lock device comprising:

an elongate first frame member extending between a first end and a second end;

an elongate second frame member extending between a first end and a second end;

a pivot connection pivotally connecting the first end of said first frame member with the first end of said second frame member;

a first contact pad attached to said first frame member and being adapted for contacting a portion of said main upper hub assembly;

a second contact pad attached to said second frame member and being adapted for contacting a portion of said pitch case; and an actuator coupled to each of said first frame member and said second frame member and being adapted for moving said first frame member relative to said second frame member between a retracted position and an extended position, said actuator comprising an actuating member, a threaded actuating shaft extending between said first frame member and said actuating member, a first bushing coupled to said first frame member and with a first end of said actuating shaft, and an internally threaded bushing coupled to said second frame member and threadably coupled with said actuating shaft, wherein rotation of said actuating shaft forces said first frame member to pivot about said pivot connection and move relative to said second frame member;

said flap lock device being insertable between said main upper hub assembly and said pitch case when in said retracted position.

8. The flap lock device as recited in claim 7 wherein said first bushing is coupled to the second end of the first frame member and said threaded bushing is coupled adjacent the second end of the second frame member.

9. The flap lock device as recited in claim 8, and further comprising a locking member for locking said actuating shaft from rotating and preventing said first frame member from moving relative to said second frame member.

10. The Flap lock device as recited in claim 9 wherein said locking member comprises a locking nut threadably mounted on said threaded actuating shaft between said actuating member and said second frame member.

11. The flap lock device as recited in claim 7 wherein at least one of said first contact pad and said second contact pad comprises a nylon pad.

12. The flap lock device as recited in claim 11 wherein each of said first contact pad and said second contact pad is removably attached to said first frame member and said second frame member.

13. The flap lock assembly as recited in claim 7 wherein said first frame member and said second frame member comprise a metal.

14. A method of restraining flapping movement of a main rotor blade assembly on a helicopter, said helicopter having a main upper hub assembly mounted to a main rotor shaft and said main rotor blade assembly coupled to said main upper hub assembly through a pitch case, said method comprising the steps of:

providing a flap lock device having a first contact pad for contacting said main upper hub assembly and a second contact pad for contacting said pitch case, said first contact pad attached to a first frame member and said second contact pad attached to a second frame member, and said first and second contact pads movable between a retracted position and an expanded position through an actuating device coupled to each of said first frame member and said second frame member;

inserting said flap lock device such that said first contact pad is aligned with a portion of said main upper hub assembly and said second contact pad is aligned with a portion of said pitch case;

actuating said actuating device such that said first contact pad and said second contact pad are moved outwardly towards the expanded position and said first contact pad contacts said portion of said main upper hub assembly and said second contact pad contacts said portion of said pitch case; and tightening said actuating device to rigidly fix said main upper hub assembly relative to said pitch case.

15. The method as recited in claim 14 and further comprising the step of locking the actuating device to maintain the main upper hub assembly fixed relative to the pitch case.

16. The method as recited in claim 14 wherein the provided flap lock device further comprises a pivot connection pivotally coupling said first frame member to said second frame member and said pivot connection has a central pivot bore and wherein said step of inserting said flap lock device comprises the steps of:

aligning said central pivot bore adjacent to and coaxial with a second bore on said main upper hub assembly; and inserting a pivot pin through said central pivot bore and through said second bore such that said flap lock device is pivotally fixed to said main rotor hub assembly.

17. The method as recited in claim 16 wherein the step of actuating said actuating device comprises the step of rotating a threaded shaft coupled with a first bushing on said first frame member and threadably coupled with an internally threaded second bushing on said second frame member to forcibly move said first frame member outwardly relative to said second frame member.

18. The method as recited in claim 14 wherein the step of actuating said actuating device comprises moving said first frame member relative to said second frame member until said main rotor blade is forced against a droop stop mechanism on said helicopter.

19. A flap lock device for restraining a main rotor blade assembly on a helicopter, said helicopter having a main upper hub assembly mounted to a main rotor shaft and said main rotor blade assembly being coupled to said main upper hub assembly through a pitch case, said flap lock device comprising:

a first frame member;

a second frame member movably coupled to said first frame member;

a first contact pad attached to said first frame member and being adapted for contacting a portion of said main upper hub assembly;

a second contact pad attached to said second frame member and being adapted for contacting a portion of said pitch case;

an actuator coupled to each of said first frame member and said second frame member and being adapted for moving said first frame member relative to said second frame member and between a retracted position and an extended position; and an internally threaded bushing coupled to said first frame member, said actuator comprising a threaded shaft adapted for threadable engagement with said threaded bushing to forcibly move said first frame member relative to said second frame member;

wherein said flap lock device is insertable between said main upper hub assembly and said pitch case when in said retracted position.

20. The flap lock device as recited in claim 19, and further comprising a second internally threaded bushing coupled to said second frame member and adapted for threadable engagement with said threaded shaft.

* * * * *